(12) United States Patent
Huang et al.

(10) Patent No.: US 10,999,842 B2
(45) Date of Patent: *May 4, 2021

(54) APPARATUS AND METHOD FOR REPORTING SYSTEM FRAME NUMBER (SFN) AND SUBFRAME OFFSET IN DUAL CONNECTIVITY (DC) ENHANCEMENT

(71) Applicant: Apple Inc., Cupertino, CA (US)

(72) Inventors: Rui Huang, Beijing (CN); Yang Tang, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,087

(22) Filed: Jan. 20, 2020

(65) Prior Publication Data

US 2020/0163086 A1 May 21, 2020

Related U.S. Application Data

(63) Continuation of application No. 15/755,529, filed as application No. PCT/US2015/066631 on Dec. 18, 2015, now Pat. No. 10,542,539.

(Continued)

(51) Int. Cl.
*H04W 76/28* (2018.01)
*H04W 76/27* (2018.01)
(Continued)

(52) U.S. Cl.
CPC ......... *H04W 72/0446* (2013.01); *H04L 5/001* (2013.01); *H04L 5/0035* (2013.01);
(Continued)

(58) Field of Classification Search
CPC ............. H04W 72/0446; H04W 24/08; H04W 36/0088; H04W 5/0035; H04W 36/30; H04L 27/0006; H04L 5/0055
See application file for complete search history.

(56) References Cited

U.S. PATENT DOCUMENTS

2010/0317343 A1  12/2010  Krishnamurthy et al.
2011/0312339 A1  12/2011  Kuningas et al.
(Continued)

FOREIGN PATENT DOCUMENTS

WO   2014098395 A1   6/2014
WO   2017034604 A1   3/2017

OTHER PUBLICATIONS

European Application Ser. No. 15902465.2, Examiner Interview Summary dated Oct. 26, 2018, 1 pg.

(Continued)

*Primary Examiner* — Iqbal Zaidi
(74) *Attorney, Agent, or Firm* — Kowert, Hood, Munyon, Rankin & Goetzel, P.C.

(57) ABSTRACT

Embodiments of a user equipment (UE) for reporting of timing offset for dual connectivity enhancement are disclosed herein. The UE can include transceiver circuitry to connect to a master cell group via a master evolved node B (eNB) and a secondary cell group via a secondary eNB. Additionally, the UE can receive a first reference signal from the master eNB and a second reference signal from a secondary eNB. Moreover, the UE can include processing circuitry to calculate a system frame number (SFN) and subframe timing difference (SSTD) based on the first reference signal and the second reference signal. Moreover, the UE can generate a measurement report having a synchronization indicator for dual connectivity based on the calculated SSTD. Subsequently, the UE can send the generated measurement report to the master eNB.

22 Claims, 11 Drawing Sheets

Related U.S. Application Data

(60) Provisional application No. 62/210,717, filed on Aug. 27, 2015.

(51) Int. Cl.
| | |
|---|---|
| *H04W 52/28* | (2009.01) |
| *H04W 84/04* | (2009.01) |
| *H04W 76/15* | (2018.01) |
| *H04W 88/06* | (2009.01) |
| *H04W 72/04* | (2009.01) |
| *H04W 24/10* | (2009.01) |
| *H04W 56/00* | (2009.01) |
| *H04L 5/00* | (2006.01) |

(52) U.S. Cl.
CPC .......... *H04L 5/0048* (2013.01); *H04W 24/10* (2013.01); *H04W 56/001* (2013.01); *H04W 56/0015* (2013.01); *H04W 76/27* (2018.02); *H04W 76/28* (2018.02); *H04W 52/288* (2013.01); *H04W 76/15* (2018.02); *H04W 84/045* (2013.01); *H04W 88/06* (2013.01)

(56) References Cited

U.S. PATENT DOCUMENTS

| | | | |
|---|---|---|---|
| 2012/0015667 | A1 | 1/2012 | Woo et al. |
| 2013/0059592 | A1 | 3/2013 | Chakraborty et al. |
| 2018/0368107 | A1* | 12/2018 | Babaei ............... H04L 27/2608 |

OTHER PUBLICATIONS

European Application Ser. No. 15902465.2, Response filed Oct. 15, 2018 to Communication pursuant to Rules 161(2) and 162 EPC dated Apr. 5, 2018, 17 pgs.
European Application Ser. No. 15902465.2, Response filed Nov. 8, 2018 to Examiner Interview Summary dated Oct. 26, 2018, 9 pgs.
European Application Ser. No. 15902465.2, Extended European Search Report dated Feb. 21, 2019, 12 pgs.
Catt, "Discussion on SFN an dsubframe offset reporting for dual connectivity", 3GPP Draft; R4-154385 Discussion on SFN and Subframe Offset Reporting for Dual Connectivity, 3rd Generation Partnership Project (3GPP), Mobile Competence Centre; 650, Route Des Lucioles; F-06921 SOP vol. RAN WG4, No. Beijing, China, Retrieved from the Internet: URL:http: www.3gpp.org ftp tsg ran WG4 Radio TSGR4_76 Docs [retrieved on Aug. 17, 2015], (Aug. 17, 2015), 4 pgs.
Ericsson, "SFN and subframe offset reporting for dual connectivity", 3GPP Draft; R4-153549 7 9 3 1 SFN and Subframe Offset Reporting for Dual Connectivity REV2, 3rd Generation Partnership Project (3GPP), Mobile Competence Centre; 650, Route Des Lucioles; F-06921 SOPH vol. RAN WG4, No. Fukuoka, Japan, Retrieved from the Internet: URL:http: www.3gpp.org ftp tsg ran WG4 Radio TSGR4_75 Docs [retrieved on May 18, 2015], (May 18, 2015), 4 pgs.
Intel Corporation, "Discussion on UE reporting of SFN subframe offset for DC enhancement", 3GPP Draft; R4-152766, 3rd Generation Partnership Project (3GPP), Mobile Competence Centre; 650, Route Des Lucioles; F-06921 Sophia-Antipolis Cedex; France vol. RAN WG4, No. Fukuoka, Japan, Retrieved from the Internet: URL:http: www.3gpp.org ftp tsg ran WG4 Radio TSGR4_75 Docs [retrieved on May 18, 2015], (May 18, 2015), 6 pgs.
"Acquisition of SeNB SFN in the dual connectivity", R4-142726 3GPP TSG RAN WG4 Meeting #71, (May 2014), 3 pgs.
"Discussion on SFN timing difference in Dual connectivity", R4-143028 3GPP TSG-RAN WG4 Meeting #71, (May 2014), 7 pgs.
"Draft LS on response SFN handling issue in dual connectivity", R4-143843 3GPP TSG-RAN WG4 Meeting #71, (May 2014), 2 pgs.
"Email discussion report on [91#30][LTE/DCe] SFN/subframe offset reporting", R2-154398 eGPP TSG-RAN WG2 #91bis, (Oct. 2015), 15 pgs.
"International Application Serial No. PCT/US2015/066631, International Search Report dated Jun. 23, 2016", 4 pgs.
"New WI proposal: Dual Connectivity enhancements for LTE", RP-150490 3GPP TSG RAN Meeting #67m (Mar. 2015), 3 pgs.
"RRM requirements of DC enhancement", R4-151487 3GPP TSG RAN Working Group 4 (Radio) Meeting #74bis, (Apr. 2015), 3 pgs.
"Wayforwardon SFN and subframeoffset reporting for DC enhancement", R4-155194 3GPP TSG RAN WG4 #76, (Aug. 2015), 2 pgs.

* cited by examiner

*MeasResults* information element

```
-- ASN1START

MeasResults ::=                         SEQUENCE {
    measId                                  MeasId,
    measResultPCell                     SEQUENCE {
        rsrpResult                              RSRP-Range,
        rsrpResult                              RSRQ-Range
    },
}

MeasResultSSTDForDCE-r13 ::=            SEQUENCE {
    SFNDiff-r13         INTEGER (-512,..., 511),
    FODiff-r13          INTEGER (-5,..., 4),
    SBODiff-r13         INTEGER (0,..., N)

}
....
}
-- ASN1STOP
```

*FIG. 9*

======Text in TS 36.331======

*RRCConnectionReconfiguration message*

-- ASN1START

....

```
SCG-ConfigPartSCG-r12 ::=          SEQUENCE {
    radioResourceConfigDedicatedSCG-r12    radioResourceConfigDedicatedSCG-r12    OPTIONAL,  -- Need ON
    sCellToReleaseListSCG-r12              sCellToReleaseList-r10                 OPTIONAL,  -- Need ON
    pSCellToAddMod-r12                     pSCellToAddMod-r12                     OPTIONAL,  -- Need ON
    sCellToAddModListSCG-r12               sCellToAddModList-r10                  OPTIONAL,  -- Need ON
    mobilityControlInfoSCG-r12             mobilityControlInfoSCG-r12             OPTIONAL,  -- Need ON
...
}

SCG-ConfigPartSCG-r13 ::=
    subframeOffsetRptMarginl               SEQUENCE {
    subframeOffsetRptQuantizedStep         INTEGER (0..,33)
                                           ENUMERATED (5,10,20,40,80,160,320,640,1280)
...
}
``` subframeOffsetRptMarginl is to define the margin for sync/async DC decision
subframeOffsetRptQuantizedStep is to define the quantized step for subframe boundary Offset ======End Text in TS 36.331======

*FIG. 10*

APPARATUS AND METHOD FOR REPORTING SYSTEM FRAME NUMBER (SFN) AND SUBFRAME OFFSET IN DUAL CONNECTIVITY (DC) ENHANCEMENT

PRIORITY CLAIM

This application is a continuation of U.S. patent application Ser. No. 15/755,529, filed Feb. 26, 2018, which is a U.S. National Stage Application under U.S.C. 371 from International Application No. PCT/US2015/066631, filed Dec. 18, 2015, which claims priority to U.S. Provisional Patent Application Ser. No. 62/210,717, filed Aug. 27, 2015, each of which are incorporated herein by reference in their entirety.

TECHNICAL FIELD

Embodiments pertain to wireless communications. Some embodiments relate to cellular communication networks, including networks configured to operate in accordance with the third-generation partnership project (3GPP) long term evolution (LTE) and LTE-advanced (LTE-A) standards.

BACKGROUND

Current issues with communicating data over a wireless network can include low throughput, frequent handovers, handover failures, inefficient offloads, and service interruptions.

Dual connectivity (DC) in an LTE network can significantly improve per-user throughput, reduce handovers, and reduce handover failures by allowing a user to be connected simultaneously to a master cell group and a secondary cell group via a macro evolved Node B (eNB) and a small cell eNB.

With regards to low throughput, dual connectivity can increase per-user throughput by aggregating radio resources from at least two eNBs. Additionally, throughput can be increased by transmitting or receiving multiple streams and dynamically adapting to the best radio conditions of multiple cells. Also, small cell eNBs can provide additional capacity for UEs having multiple radio connections.

Moreover, moving UEs suffer frequent handover failure, inefficient offload, and service interruption. The consequences are more severe if the UE's velocity is higher and cell coverage is smaller. Dual connectivity can reduce the handover failure rate by maintaining the macro eNB (e.g., primary cell) connection as the coverage layer. Dual connectivity also helps in load balancing between the macro eNB and the small cell eNB secondary cell).

Furthermore, dual connectivity can reduce signaling overhead towards the core network due to frequent handover. For example, signaling overhead can be reduced by not issuing handover operations as long as the UE is within macro coverage.

However, dual connectivity can impose several technical challenges.

BRIEF DESCRIPTION OF THE DRAWINGS

FIG. 9 illustrates an example of a MeasResults information element sent by a UE, in accordance with some embodiments;
FIG. 10 is an example of a RRCConnectionReconfiguration message sent by a eNB, in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In this disclosure, embodiments are often discussed with reference to a master eNB and a secondary eNB. Additionally, various embodiments disclosed herein are applicable in other settings with other terminology. For example, a master eNB can be denoted as an "anchor eNB," "primary eNB," or "macro eNB," while a secondary eNB can be denoted as an "assisting eNB," "macro eNB," or "slave eNB."

In current implementations, the UE can measure an SFN and sub frame difference between the master eNB (MeNB) and the secondary eNB (SeNB) for dual connectivity. For example, the SFN and subframe timing offset can be determined and reported by the network.

However, in a multi-vendor deployment, a drawback can include the UE not obtaining the SFN and subframe timing offset information from the network. In the multi-vendor deployment example, the different vendors may not have network coordination via different operations and management (OAM) for DC. Therefore, the network may not be able to obtain the SFN and subframe timing offset information.

According to some embodiments, techniques for UE based reporting on SFN and subframe offset between MeNB and SeNB are described herein.

Figure 1:
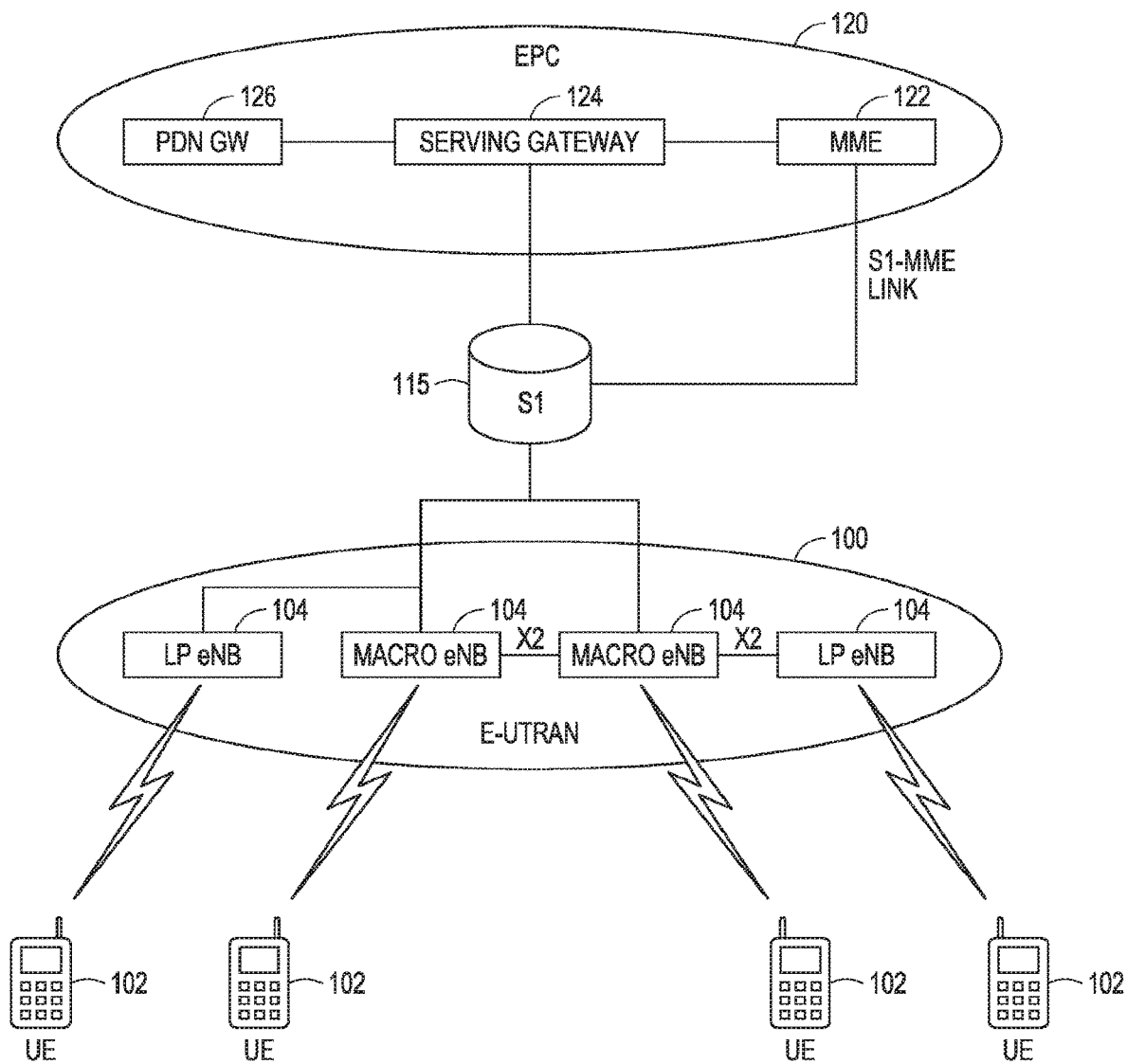
FIG. 1 is a functional diagram of a 3GPP network, in accordance with some embodiments.
Figure 2:
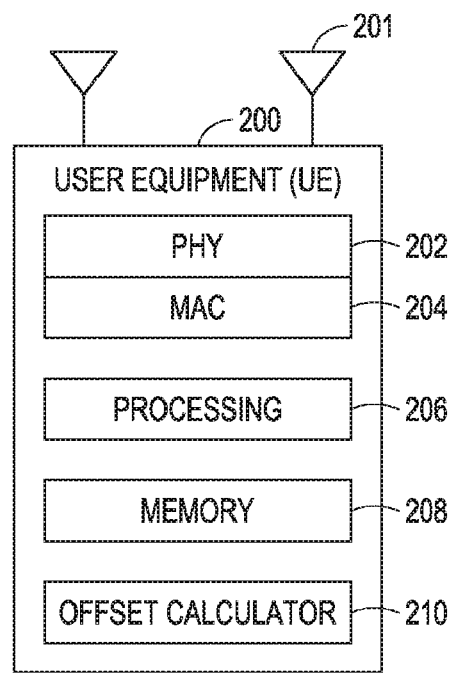
FIG. 2 is a functional diagram of a UE, in accordance with some embodiments.
Figure 3:
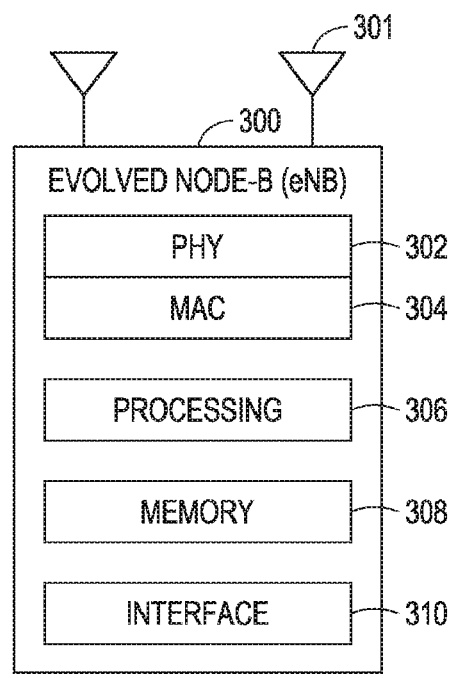
FIG. 3 is a functional diagram of an eNB, in accordance with some embodiments.

As an overview, FIGS. 1-3 illustrate functional diagrams of an exemplary 3GPP network, a UE, and an eNB, respectively.

FIG. 1 is a functional diagram of a 3GPP network, in accordance with some embodiments. The network comprises a radio access network (RAN) (e.g., as depicted, the E-UTRAN or evolved universal terrestrial radio access network) 100 and a core network 120 (e.g., shown as an EPC) coupled together through an S1 interface 115. For the sake of convenience and brevity, only a portion of the core network 120, as well as the RAN 100, is shown.

The core network 120 includes a mobility management entity (MME) 122, serving gateway (serving GW) 124, and a packet data network gateway (PDN GW) 126. The RAN 100 includes eNBs 104 (which may operate as base stations) for communicating with UEs 102. The eNBs 104 may include macro eNBs and low power (LP) eNBs, such as micro eNBs.

The MME 122 is similar in function to the control plane of legacy Serving GPRS Support Nodes (SGSN). The MME 122 manages mobility aspects in access such as GW selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the PDN. The PDN GW 126 routes data packets between the core network 120 and the external PDN, and may be a key node for policy enforcement and charging data collection. It may also provide an anchor point for mobility with non-LTE accesses. Time external PDN can be any kind of IP network, as well as an IMS domain. The PDN GW 126 and the serving GW 124 may be implemented in one physical node or separate physical nodes.

The eNBs 104 terminate the air interface protocol and may be the first point of contact for a UE 102. In some embodiments, an eNB 104 may fulfill various logical functions for the RAN 100 including but not limited to RNC (radio network controller functions) such as radio bearer management uplink and downlink dynamic radio resource management and data packet scheduling, and mobility management. In accordance with embodiments, UEs 102 may be configured to communicate orthogonal frequency-division multiplexing (OFDM) communication signals with an eNB 104 over a multicarrier communication channel in accordance with an orthogonal frequency-division multiple access (OFDMA) communication technique. The OFDM signals may comprise a plurality of orthogonal subcarriers.

The S1 interface 115 is the interface that separates the RAN 100 and the core network 120. It is split into two parts: the S1-U, which carries data traffic between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In cellular networks, low power (LP) cells are typically used to extend coverage to indoor areas where outdoor signals do not reach well, or to add network capacity in areas with dense phone usage, such as train stations. As used herein, the term "LP eNB" refers to any suitable relatively low power eNB for implementing a narrower cell (narrower than a macro cell) such as a femtocell, a picocell, or a micro cell. Femtocell eNBs 104 are typically provided by a mobile network operator to its residential or enterprise customers. A femtocell is typically the size of a residential gateway or smaller and generally connects to the user's broadband line. In some instances, a home eNB gateway may be inserted between a home eNB 104 (e.g., femtocell eNB) and the MME 122 and serving gateway 124. The home eNB gateway can control several home eNBs 104 and concentrates the user data and signaling traffic from the home eNBs 104 towards the MME 122 and serving gateway 124. Similarly, a picocell is a wireless communication system typically covering a small area, such as in-building (offices, shopping malls, train stations, etc.), or, more recently, in-aircraft. A picocell eNB 104 can generally connect through the X2 link to another eNB 104, such as a macro eNB 104, through its base station controller (BSC) functionality. Additionally, the picocell eNB 104 is connected via an S1 interface to an MME 122 or service gateway 124. Thus, an LP eNB 104 may be implemented with a picocell eNB 104 since it is coupled to a macro eNB 104 via an X2 interface. Picocell eNBs 104 or other LP eNBs 104 may incorporate some or all functionality of a macro eNB 104. In some cases, this may be referred to as an access point base station or enterprise femtocell.

In some embodiments, a downlink resource grid may be used for downlink transmissions from an eNB 104 to a UE 102, while uplink transmissions from the UE 102 to the eNB 104 may utilize similar techniques. The grid may be a time-frequency grid, called a resource grid or time-frequency resource grid, which is the physical resource in the downlink in each slot. Such a time-frequency plane representation is common for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. There are several different physical downlink channels that are conveyed using such resource blocks. With particular relevance to this disclosure, two of these physical downlink channels are the physical downlink shared channel (PDSCH) and the physical downlink control channel (PDCCH).

The PDSCH carries user data and higher-layer signaling to a LIE 102. The PDCCH carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a LIE 102 on the PDCCH used for (assigned to) the UE 102.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four quadrature phase-shift keying (QPSK) symbols are mapped to each REG. The PDCCH can be transmitted using one or more CCEs, depending on the size of DCI and the channel condition. There may be four or more different PDCCH formats defined in LTE with different numbers of CCEs (e.g., aggregation level L=1, 2, 4, or 8).

FIG. 2 is a functional diagram of a UE 200, in accordance with some embodiments. FIG. 3 is a functional diagram of an evolved node-B (eNB) 300, in accordance with some embodiments. The UE 200 can be a UE 102 as depicted in FIG. 1, while the eNB 300 can be an eNB 104 as depicted in FIG. 1.

The LIE 200 can include physical layer circuitry 202 for transmitting and receiving signals to and from the eNB 300, other eNBs, other UEs, or other devices using one or more antennas 201, while the eNB 300 can include physical layer circuitry 302 for transmitting and receiving signals to and from the UE 200, other eNBs, other UEs, or other devices using one or more antennas 301.

The UE 200 can also include medium access control layer (MAC) circuitry 204 for controlling access to the wireless medium, while the eNB 300 can also include MAC circuitry 304 for controlling access to the wireless medium.

The UE 200 can also include processing circuitry 206 and memory 208 arranged to perform the operations described herein, and the eNB 300 can also include processing circuitry 306 and memory 308 arranged to perform the operations described herein.

The UE 200 can include an offset calculator 210 which interfaces with other components of the UE 200 (e.g., antenna 201, PHY 202, and MAC 204, processing circuitry 206, memory 208) to communicate with the eNB 300 via a radio interface. Additionally, the offset calculator 210 can have processing circuitry and memory and interfaces to communicate with the other components of the UE 200 via one or more internal interfaces.

The eNB 300 can also include one or more interfaces 310, which can enable communication with other components, including other eNBs 104 (FIG. 1), components in the core network 120 (FIG. 1), or other network components. In addition, the interfaces 310 can enable communication with other components that may not be shown in FIG. 1, including components external to the network. The interfaces 310 may be wired, wireless, or a combination thereof.

The antennas 201, 301 may comprise one or more directional or omnidirectional antennas, including, for example, dipole antennas, monopole antennas, patch antennas, loop antennas, microstrip antennas, or other types of antennas suitable for transmission of radio frequency (RF) signals. In some multiple-input multiple-output (MIMO) embodiments, the antennas 201, 301 may be effectively separated to take advantage of spatial diversity and the different channel characteristics that may result.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device including wearable devices that may receive and/or transmit information wirelessly. In some embodiments, the mobile device or other device can be a UE 200 or an eNB 300 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas 201, 301, a graphics processor, an application processor, speakers, and other mobile device elements. The display may be a liquid crystal display (LCD) screen including a touch screen.

Although the LIE 200 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors that may be configured with instructions stored on a computer-readable storage device.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, the eNB 300 may be part of a broadband wireless access (BWA) communication network, such as a Worldwide Interoperability for Microwave Access (WiMAX) communication network, a 3GPP Universal Terrestrial Radio Access Network (UTRAN) LTE network, or a LTE communication network, although the scope of this disclosure is not limited in this respect. In these broadband multicarrier embodiments, the LIE 200 and the eNB 300 may be configured to communicate in accordance with an OFDMA technique.

SFN and Subframe Timing Difference (SSTD) in DC Enhancement

Figure 4:
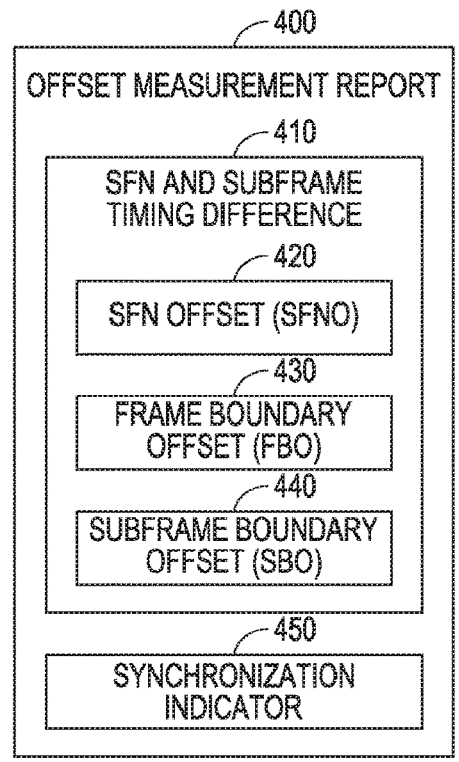
FIG. 4 illustrates an example of an offset measurement report generated by a UE, in accordance with some embodiments.

FIG. 4 illustrates an example of an offset measurement report 400, in accordance with some embodiments. The offset measurement report 400 can also be simply referred as the measurement report. As will be illustrated in FIG. 5, the UE 102 can receive reference signals from a master eNB 104 (MeNB) and a secondary eNB 104 (SeNB). Subsequently, the UE 102 can calculate the measurement report 400 based on the received reference signals, and sent the measurement report 400 to the MeNB.

According to some embodiments, the measurement report 400 can include a SFN and subframe timing difference (SSTD) 410 in DC enhancement. The SSTD 410 can include: a SFN offset between MeNB and SeNB (SFNO) 420; (2) a frame boundary offset between MeNB and SeNB (FBO) 430; or a subframe boundary offset (SBO) 440. In some instances, the SSTD 410 can include the SFNO 420, the FBO 430, and the SBO 440. In some instances, the reporting range for the SFNO can be [−512, 511) in frame In some instances, the reporting range for FBO 430 can be [−5, 5) in subframe.

According to some embodiments, the measurement report 400 can include a synchronization indicator 450. The synchronization indicator 450 can indicate whether that the MeNB and the SeNB are synchronous to each other. In some instances, when the UE 102 cannot determine whether the MeNB and the SeNB are synchronous or asynchronous, then the synchronization indicator 450 can be quantized as later described in Table 1.

For example, the subframe timing difference between the MeNB and the SeNB can measured by UE 102, and denoted by T_subframeoffset. When the T_subframeoffset is less than 33 μs minus a margin value, the UE 102 can report a 'sync' notification to the network. Additionally, when the T_subframeoffset is greater than 33 μs plus a margin value, the UE 102 can report an 'async' notification to the network Otherwise, the T_subframeoffset can be quantized and reported to the network. In some instances, the margin value is received by a network entity. For example, the margin value can be predetermined by the network operator, and sent to the UE 102 by a network entity.

Figure 5:
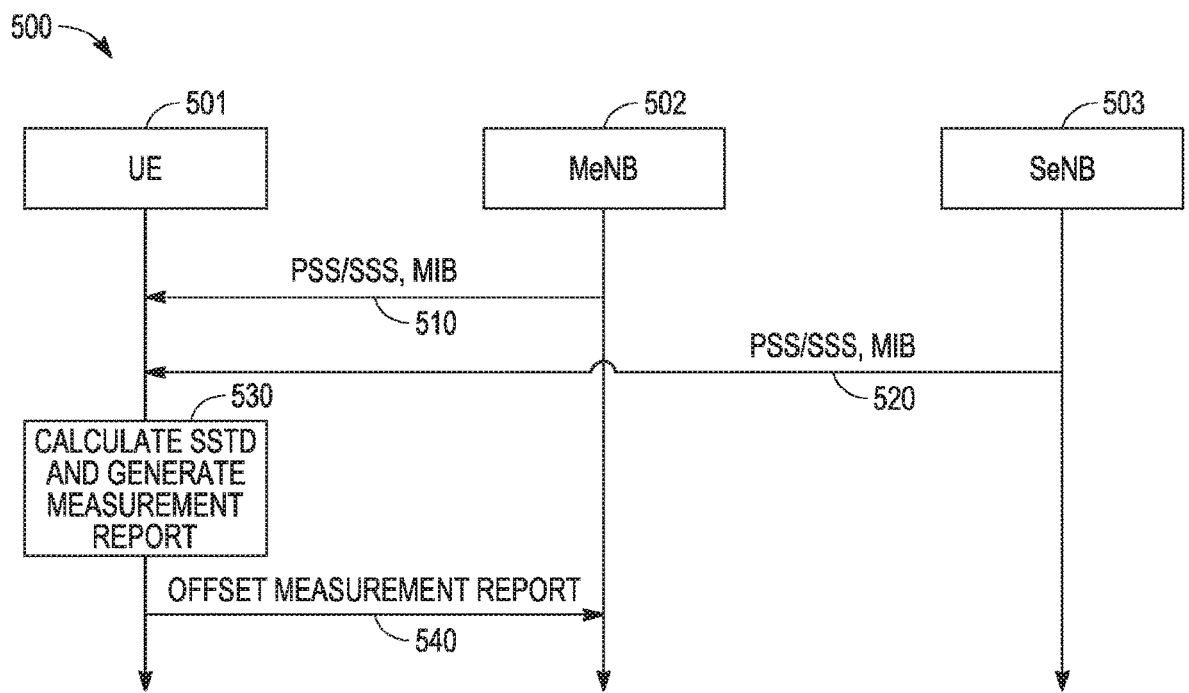
FIG. 5 illustrates an example of a communication 500 of a UE, MeNB, and a SeNB in DC enhancement, in accordance with some embodiments.

In some instances, the UE 200, using the timing offset apparatus, can determine the SSTD 410, the SFNO 420, the FBO 430, the SBO 440, and the synchronization indicator 450. The timing offset apparatus can calculate the offset information for the measurement report 400 based on the information from the reference signals received from the MeNB and the SeNB. The reference signals can be received by the UE 102's transceiver or physical layer circuitry 202.
Example UE Reporting on SFN and Subframe Offset in DC in LTE FIG. 5 illustrates an example of a communication 500 of a UE 501, a MeNB 502, and a SeNB 503 in DC enhancement, in accordance with some embodiments. The communication 500 can be reporting procedures for SFN and subframe offset in DC enhancement, in accordance with some embodiments. For example, UE 501 can generate a measurement report (e.g., measurement report 400 in FIG. 4) and send the measurement report to the MeNB 502. The communication 500 can be between a UE 501 (e.g., UE 102), a MeNB 502 (e.g., eNB 104), and SeNB 503 (e.g., eNB 104). In the DC enhancement, the UE 501 can connect to a master cell group (MCG) via the MeNB 502, and the UE 501 can connect to a secondary cell group (SCG) via the SeNB 503.

At operation 510, the UE 501 can receive a first reference signal from the MeNB 502. The first reference signal can include a primary synchronization signal (PSS), a secondary synchronization signal (SSS), a cell-specific Reference signal (CRS), a positioning reference signal (PRS), or a master information block (MIB).

At operation 520, the UE 501 a second reference signal from the SeNB 503. Similar to the first reference signal, the second reference signal can include a PSS, a CRS, a PRS, a SSS, or a MIB.

At operation 530, the UE 501 can calculate the SFN and subframe timing difference 410 (SSTD) based on the first reference signal and the second reference signal. Additionally, the UE 501 can generate a measurement report (e.g., measurement report 400 in FIG. 4) that includes the calculated SSTD 410 and a synchronization indicator (e.g., synchronization indicator 450 in FIG. 4). In some instances, the measurement report 400 may only include the SSTD 410.

As previously mentioned in FIG. 4, the SSTD 410 can include: (1) a SFN offset between MeNB 502 and SeNB 503 (SFNO 420); (2) a frame boundary offset between MeNB 502 and SeNB 503 (FBO 430); or a subframe boundary offset 440 (SBO). The SFNO 420, FBO 430, and SBO 440 can be calculated using the timing information (e.g., PSS, SSS, CRS, PRS, or MIB) received from the MeNB 502 and the SeNB 503 via the first and second reference signals at operations 510 and 520.

In some instances. After the UE 501 synchronized with MeNB 502 and SeNB 503 separately, the SFN timing difference between MCG and SCG can be calculated from the received MIBs of MeNB 502 and SeNB 503. The SFNO (e.g., SFNO 420 in FIG. 4) can be determined based on the calculated SFN timing difference. In some instances, the SFNO (e.g., SFNO 420 in FIG. 4) is equal to the SFN timing difference. Equation 1 is an example of calculating the SFN timing difference.

$$\text{SFN\_offset} = \text{SFN\_MCG} - \text{SFN\_SCG} \text{ [Frame level]} \qquad (\text{Eq. 1})$$

Additionally, the FBO (e.g., FBO 430 in FIG. 4) can be determined based on the frame boundary timing of MCG and SCG (denoted as "T_mcg" and "T_scg"). The frame boundary timing of MCG and SCG can be measured in Ts unit. For example, Ts, which is a basic time unit defined by 3GPP, is equal to 1/(15000×2048) seconds. Equation 2 is an example of calculating the frame boundary timing offset between MCG and SCG, according to some embodiments, $$T\_\text{offset\_Frame} = T\_\text{mcg} - T\_\text{scg} \text{ in } Ts \qquad (\text{Eq. 2})$$

Once the FBO (e.g., FBO 430 in FIG. 4) has been calculated, the FBO 430 can be reported to the network (e.g., MeNB 502) by the UE 501 in subframe granularity, as later described in Table 1. Equation 3 is an example of reporting the FBO 430 in subframe granularity, according to some embodiments.

$$\text{FrameTiming\_offset} = \text{floor}(T\_\text{offset\_Frame}/30720) \text{ in milli-seconds (ins)} \qquad (\text{Eq. 3})$$

Moreover, Equation 4 is an example of calculating the subframe boundary offset by UE 501, according to some embodiments.

$$\text{Subframe\_offset\_meas} = \text{mod}(\text{abs}(T\_\text{offset\_Frame}), 30720/2)*1000 \text{ (in } Ts) \text{ or by other UE measurement (e.g. reference signal time difference (RSTD), PRS RSTD, CRS Rx-Tx timing difference)} \qquad (\text{Eq. 4})$$

Subsequently, the SBO (e.g., SBO 440 in FIG. 4) repotting to the MeNB 502 can be determined using flowchart 600 in FIG. 6. In some instances, the determinations and calculations in FIG. 6 can be performed using the offset calculator 210 from FIG. 2.

Figure 6:
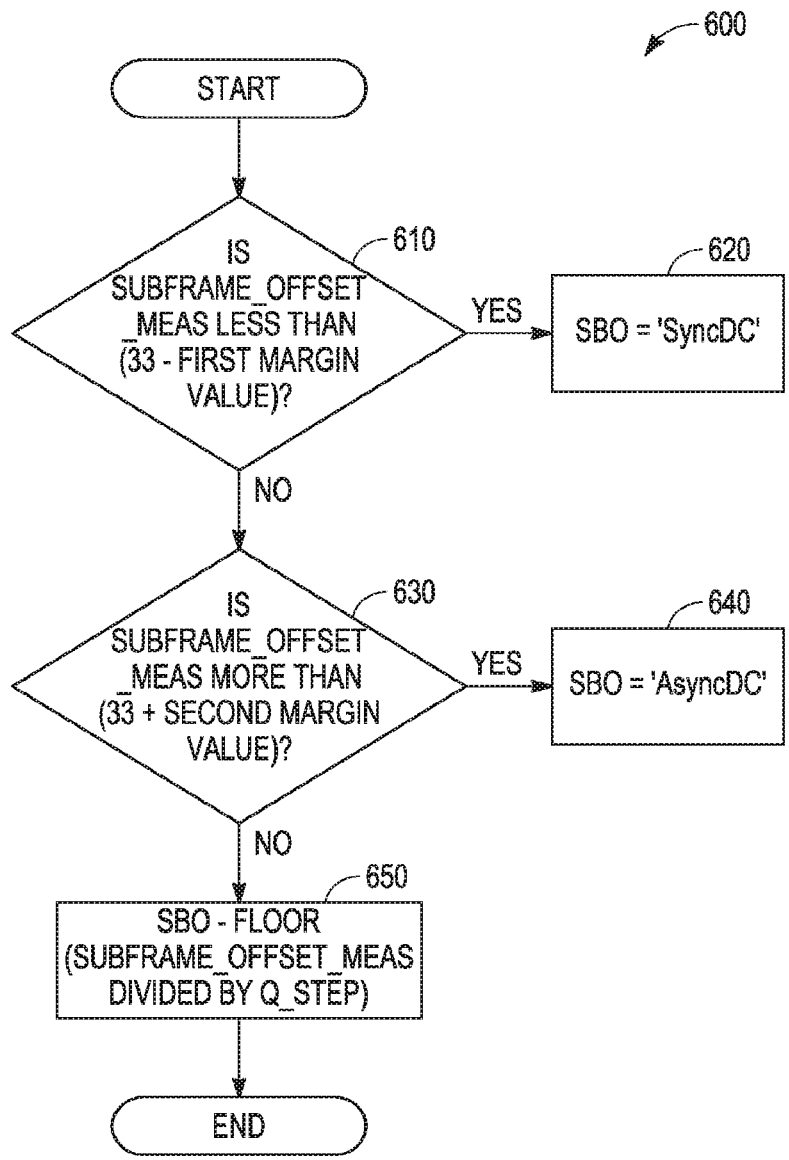
FIG. 6 illustrates an example flowchart for calculating the subframe boundary offset (SBO), in accordance with some embodiments.

As illustrated in FIG. 6, at operation 610, the offset calculator 210 determines if the Subframe_offset_meas calculated in Equation 4 is less than 33 minus the first margin value. As previously mentioned, the Subframe_offset_meas is measured in Ts. The first margin value can be signaling from the network. For example, the first margin value can be predetermined by the network operator and sent to the UE 501 by the MeNB 502 or SeNB 503.

At operation 620, when the Subframe_offset_meas is less than 33 minus the first margin value, then the SBO 440 can be determined to be synchronous (e.g., SBO='SyncDC').

Alternatively, when the Subframe_offset_meas is not less than 33 minus the first margin value, then the flowchart 600 continues to operation 630.

At operation 630, the offset calculator 210 determines if the Subframe_offset_meas is greater than 33 plus a second margin value. The second margin value can be signaling from the network. For example, the second margin value can be predetermined by the network operator and sent to the UE 501 by the MeNB 502 or SeNB 503. In some instances, the first margin value can equal to the second margin value. Alternatively, the first margin value can be greater or less than the second margin value.

At operation 640, when the Subrame_offset meas is more than 33 plus the second margin value, then the SBO 440 can be determined to be asynchronous (e.g., SBO='AsyncDC'). In some instances, the reporting of SBO can be multiple values when "asyncDC". For example, SBO_1, SBO_2 from Table 1 are example reporting values when SBO 440 is determined to be asynchronous.

Alternatively, when the Subframe_offset_meas is not more than 33 plus the second margin value, then the flowchart 600 continues to operation 650.

At operation 650, the offset calculator 210 can granulize the SBO 440 based on Q_step. Similar to the margin values, Q_step can be signaled from the network. For example, the Q_step can be predetermined by the network operator and sent to the UE 501 by the MeNB 502 or SeNB 503. Continuing with operation 650, when the offset calculator 210 can determines the SBO 440 using Equation 5.

$$SBO=\text{floor}(Subframe\_offset\_meas/Q\_step) \quad (Eq. 5)$$

Techniques in Asynchronous in Dual Connectivity Enhancement

Figure 7:
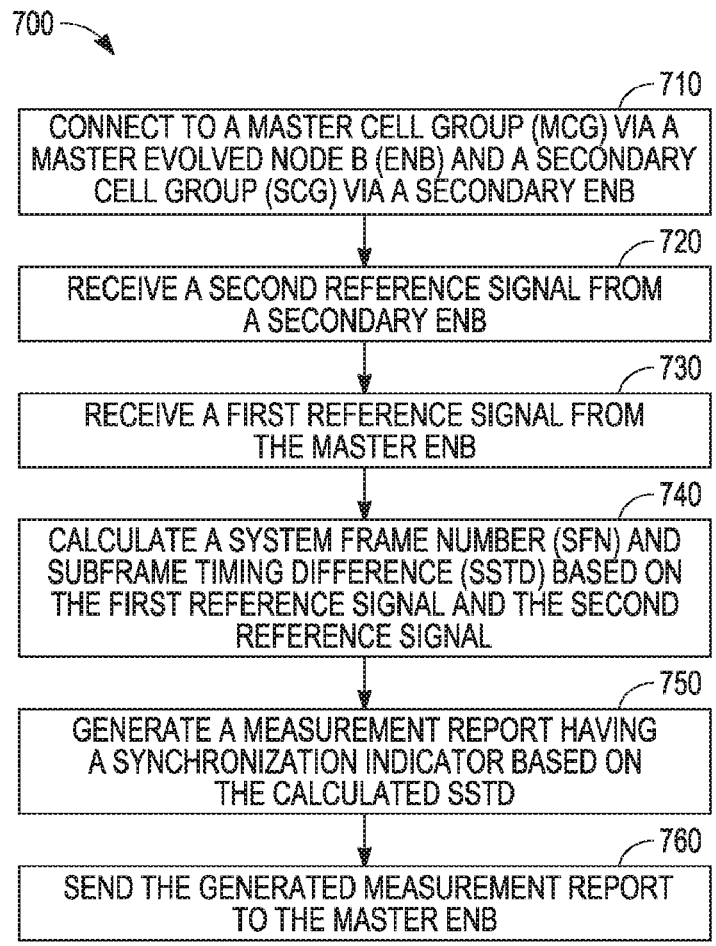
FIG. 7 illustrates the operation of a method performed by a UE to generate a measurement report, and send the measurement report to an eNB, in accordance with some embodiments.

FIG. 7 illustrates the operation of a method 700 for synchronizing in DC enhancement mode using a UE-generated measurement report 400, in accordance with some embodiments. Method 700 can be performed by a UE (e.g., UE 102. UE 200). Embodiments are not limited to these configurations, however, and some or all of the techniques and operations described herein may be applied to any systems or networks.

It is important to note that embodiments of the method 700 may include additional or even fewer operations or processes in comparison to what is illustrated in FIG. 7. In addition, embodiments of the method 700 are not necessarily limited to the chronological order that is shown in FIG. 7. In describing the method 700, reference may be made to FIGS. 1-6, although it is understood that die method 700 may be practiced with any other suitable systems, interfaces 310, and components.

In addition, while the method 700 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA) Moreover, the method 700 and other methods described herein may be practiced by wireless devices configured to operate in other suitable types of wireless communication systems, including systems configured to operate according to various IEEE standards such as IEEE 802.11.

At operation 710 of the method 700, an apparatus of the UE 102, using transceiver circuitry, can connect to a master cell group (MCG) via a master evolved node B 502 (eNB) and a secondary cell group (SCO) via a secondary eNB 503. As illustrated in FIG. 5, in dual connectivity (DC) enhancement, the UE 501 can be connected to the MCG via the MeNB 502 and the SCG via the SeNB 503. In some instances, the transceiver circuitry can be the physical layer circuitry 202 of UE 200 in FIG. 2.

At operation 720, the UE 102, using the transceiver circuitry, can receive a first reference signal from the master eNB (e.g., MeNB 502 in FIG. 5). Operation 510 in FIG. 5 can be an example of operation 720. As previously mentioned, the transceiver circuitry can be the physical layer circuitry 202 of UE 200 in FIG. 2.

At operation 730, the LIE 102, using the transceiver circuitry, can receive a second reference signal from the secondary eNB (e.g., SeNB 503 in FIG. 5). Operation 520 in FIG. 5 can be an example of operation 730. As previously mentioned, the transceiver circuitry can be the physical layer circuitry 202 of UE 200 in FIG. 2.

At operation 740, the LIE 102, using processing circuitry 206 can calculate a system frame number (SFN) and subframe timing difference 410 (SSTD) based on the first reference signal and the second reference signal. Operation 530 in FIG. 5 can be an example of operation 740. The SSTD 410 in FIG. 4 is an example of the SSTD 410 calculated at operation 740. In some instances, the processing circuitry can be the processing circuitry 206 of LIE 200 in FIG. 2. In some other instances, the offset calculator 210 can perform operation 740.

In some instances, the first reference signal can include a master information block (MIB) having SFN information for the MCG (e.g., SFN_MCG). Additionally, the second reference signal can include a MIB having SFN information for the SCG (e.g., SFN_SCG). Furthermore, the SSTD 410 includes a SFN timing difference between the MCG and the SCG that is calculated based on the SFN information for the MCG and the SFN information for the SCG. For example, the SFN timing difference can be the SFNO 420, which can be calculated by subtracting the SFN_SCG from the SFN_MCG.

At operation 750, the UE 102, using processing circuitry 206, can generate a measurement report 400 having a synchronization indicator 450 based on the calculated SSTD 410. The measurement report 400 in FIG. 4 is an example of the measurement report generated at operation 750. The synchronization indicator 450 in FIG. 4 is an example of the synchronization indicator 450 generated at operation 750. In some instances, the processing circuitry can be the processing circuitry 206 of UE 200 in FIG. 2. In some other instances, the offset calculator 210 can perform operation 750.

At operation 760, the UE 102, using the transceiver circuitry, can send the generated measurement report 400 to the master eNB. (e.g., MeNB 502 in FIG. 5). Operation 550 in FIG. 5 can be an example of operation 760. As previously mentioned, the transceiver circuitry can be the physical layer circuitry 202 of UE 200 in FIG. 2.

In some instances, the first reference signal includes a frame boundary timing of the MCG and the second reference signal includes a frame boundary timing of the SCG. Additionally, the SSTD 410 includes a frame boundary offset (e.g., FBO 430) between the MCG and the SCG that can be calculated based on the frame boundary timing of the MCG and the frame boundary timing of the SCG. For example, the frame boundary offset between the MCG and the SCG is calculated by subtracting the frame boundary timing of the SCG from the frame boundary timing of the MCG. Furthermore, the method 700 can further include the transceiver circuitry being further configured to receive, from the MeNB 502, a margin value, where the synchronization indicator 450 is further based on the received margin value. The margin value can be predetermined by a network operator associated with the MeNB 502.

In some instances, the SSTD 410 can include a subframe boundary offset measurement, the subframe boundary offset measurement being calculated from the frame boundary timing between the MCG and the SCG. For example, the SBO 440 is an example of the subframe boundary offset measurement.

In some instances, the synchronization indicator 450 can indicate that the MCG and the SCG are synchronous when the subframe boundary offset measurement, in addition to the received margin value, is less than 33 microseconds.

In some instances, the synchronization indicator 450 can indicate that the MCG and the SCG are asynchronous when the subframe boundary offset measurement minus the received margin value is more than 33 micro-seconds.

Figure 8:
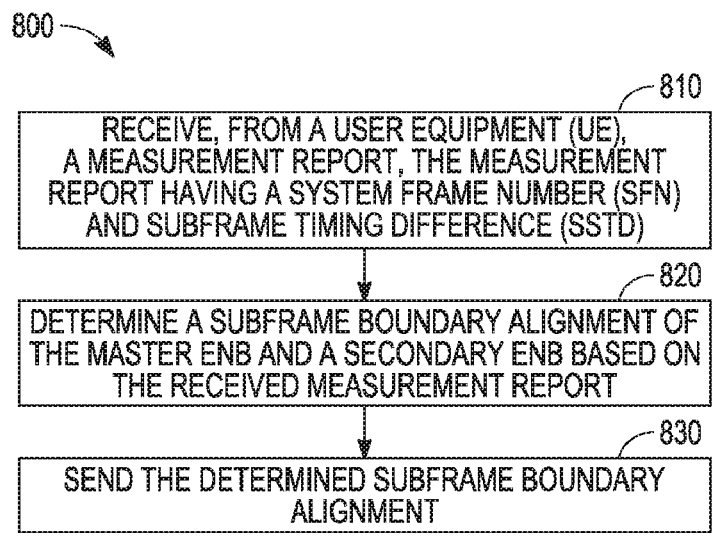
FIG. 8 illustrates the operation of a method performed by an eNB to determine a subframe boundary alignment based on a received measurement report, in accordance with some embodiments.

FIG. 8 illustrates the operation of a method 800 for enabling a MeNB 502 to synchronize during DC enhancement using a UE-generated measurement report 400, in accordance with some embodiments. Method 800 can be performed by an eNB (e.g., eNB 104). In some instances, method 800 can be performed by a MME (e.g., MME 122). It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to FIGS. 1-7, although it is understood that the method 800 may be practiced with any other suitable systems, interfaces 310, and components.

In addition, while the method 800 and other methods described herein may refer to the eNB 104 operating in accordance with 3GPP or other standards, embodiments of those methods are not limited to just those the eNB 104 and may also be practiced by a. MME 122, or other mobile devices, such as a Wi-Fi AP or STA. Moreover, the method 800, and other methods described herein, may be practiced by wireless devices configured to operate in other suitable types of wireless communication systems, including systems configured to operate according to various IEEE standards such as IEEE 802.11.

The method 800 can be performed by an apparatus of a eNB 104 configured to operate as a master eNB 502 in a dual connectivity (DC) mode.

At operation 810, the apparatus of the eNB 104, using transceiver circuitry, can receive, from a user equipment 102 (UE), a measurement report 400. The measurement report 400 can have a system frame number (SFN) and subframe timing difference (SSTD), such as SSTD 410. Method 700 of FIG. 7 illustrates the example of the UE 102 sending measurement report 400 having the SSTD 410. The transceiver circuitry of eNB 104 for performing operation 810 can be similar to the physical layer circuitry 302 in FIG. 3.

At operation 820, the apparatus of the eNB 104, using processing circuitry 206, can determine a subframe boundary alignment of the master eNB 502 and a secondary eNB 503 based on the received measurement report 400. The processing circuitry of eNB 104 for performing operation 820 can be similar to the physical layer circuitry 302 in FIG. 3.

At operation 830, the apparatus of the eNB 104, using transceiver circuitry, can send the determined subframe boundary alignment. The transceiver circuitry of eNB 104 for performing operation 810 can be similar to the physical layer circuitry 302 in FIG. 3.

In some instances, the determined subframe boundary alignment can be sent using radio resource control (RRC) signaling.

Additionally, method 800 can include an operation where the processing circuitry 306 is further configured to determine a quantized step based on the determined subframe boundary alignment. Furthermore, the transceiver circuitry can be further configured to send the determined quantized step.

Moreover, method 800 can include an operation where the processing circuitry 306 of the eNB 104 is further configured to determine a discontinuous reception (DRX) pattern based on the determined subframe boundary alignment, and the transceiver circuitry is further configured to send the determined DRX pattern.

Signaling Between the UE and the MeNB

According to some embodiments, the UE (e.g., UE 501) can send the offset timing information (e.g., measurement report 400) to the MeNB MeNB 502) using radio resource control (RRC) signaling. In some instances, the MeasResults information element (in 3GPP specification 36.331) can include parameters for the SFN0 420, the FBO 430, the SBO 440, and the synchronization indicator 450. FIG. 9 illustrates an example of the MeasResults information element 900.

Additionally, the parameters for subframe boundary alignment can be configured by die MeNB 502. For example, the MeNB 502 can send the parameters to the UE 501 using the RCC signaling example in FIG. 10. As illustrated in FIG. 10, the MeNB 502 can send an RRCConnectionReconfiguration message 1000.

Moreover, the reporting map of the SSTD 410 can be specified in 3GPP specification 36.133. In some instances, the reporting range of SSTD 410 may be specified only for the SBO 440. Table 1 is an example of the SBO measurement report mapping.

TABLE 1

SBO Measurement Report Mapping

| REPORTED VALUE | MEASURED QUANTITY VALUE |
| --- | --- |
| SBO_0 | SyncDC |
| SBO_1 | Floor(Subframe_offset_measIQ_step) |
| SBO_2 | Floor(Subframe_offset_measIQ_step) |
| ... | |
| SBO_N-1 | Floor(Subframe_offset_measIQ_step) |
| SBO_N | AsyncDC |

According to some embodiments, based on the SSTD 410 reporting (e.g., received measurement report 400), the MeNB 502 can align the measurement gap and DRX pattern for both the MCG and SCG according to the procedure below. In addition, techniques performed by the MeNB 502 based on the received measurement report 400 are not necessarily limited to the procedure below. For example, other techniques can be performed by the MeNB 502 to synchronize the MCG and the SCG.

Figure 11:
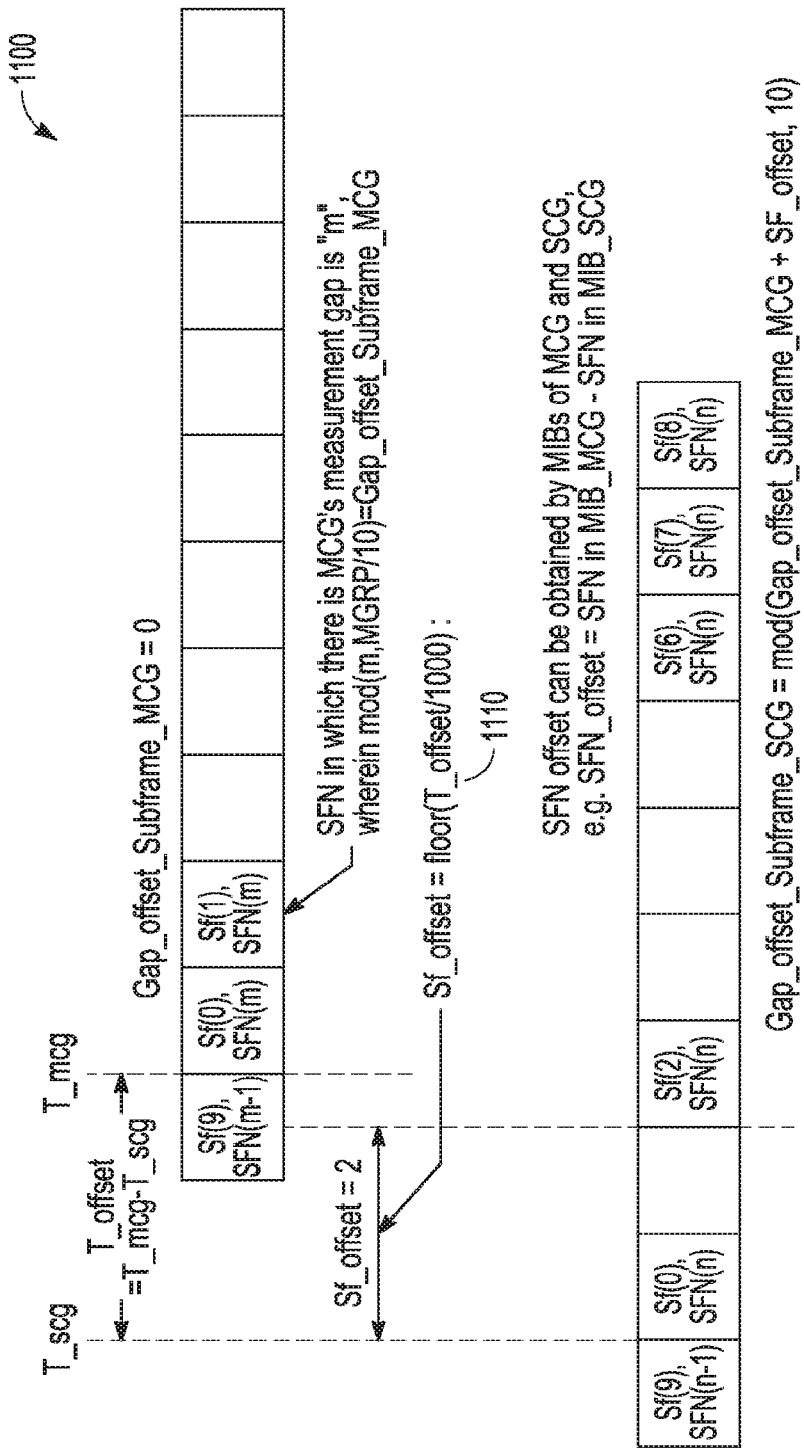
FIGS. 11 and 12 illustrate examples for SCG measurement gap configuration, in accordance with some embodiments.
Figure 12:
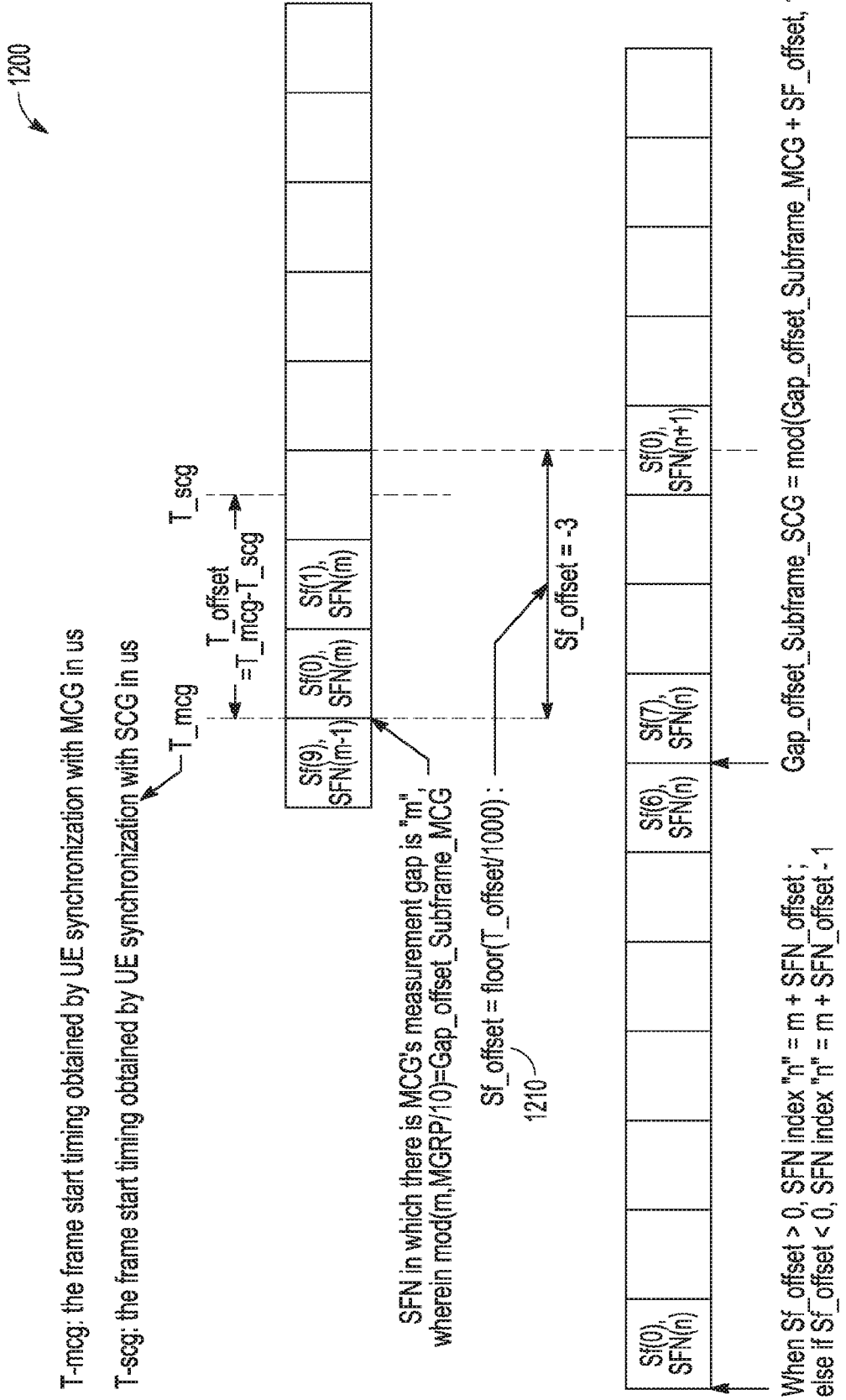

FIGS. 11 and 12 illustrate examples for SCG measurement gap configuration. FIG. 11 illustrates a method 1100 for measurement gap alignment, when the SCG is ahead of the MCG. In this example, the measurement report 400 generated by the 13E 501 can include a sf_offset that is equal to "2." Therefore, during the measurement gap alignment process, the MeNB 502 can re-align the MCG and the SCG based on the received the measurement report 400 having information that the SCG is ahead of the MCG by 2 subframes. As previously mentioned, the SFNO 420 can be obtained by MIBs of MCG and SCG SNF_offsets=SFN in MIB_MCG-SFN in MIB_SCG)

Additionally, FIG. 12 illustrates a method 1200 for measurement gap alignment when the SCG is behind the MCG. In this example, the measurement report 400 generated by the UE 501 can include a sf_offset 1210 that is equal to "−3." Therefore, during the measurement gap alignment process, the MeNB 502 can re-align the MCG and the SCG based on the received measurement report 400 having information that the SCG is behind of the MCG by 3 subframes.

Computer Hardware

Figure 13:
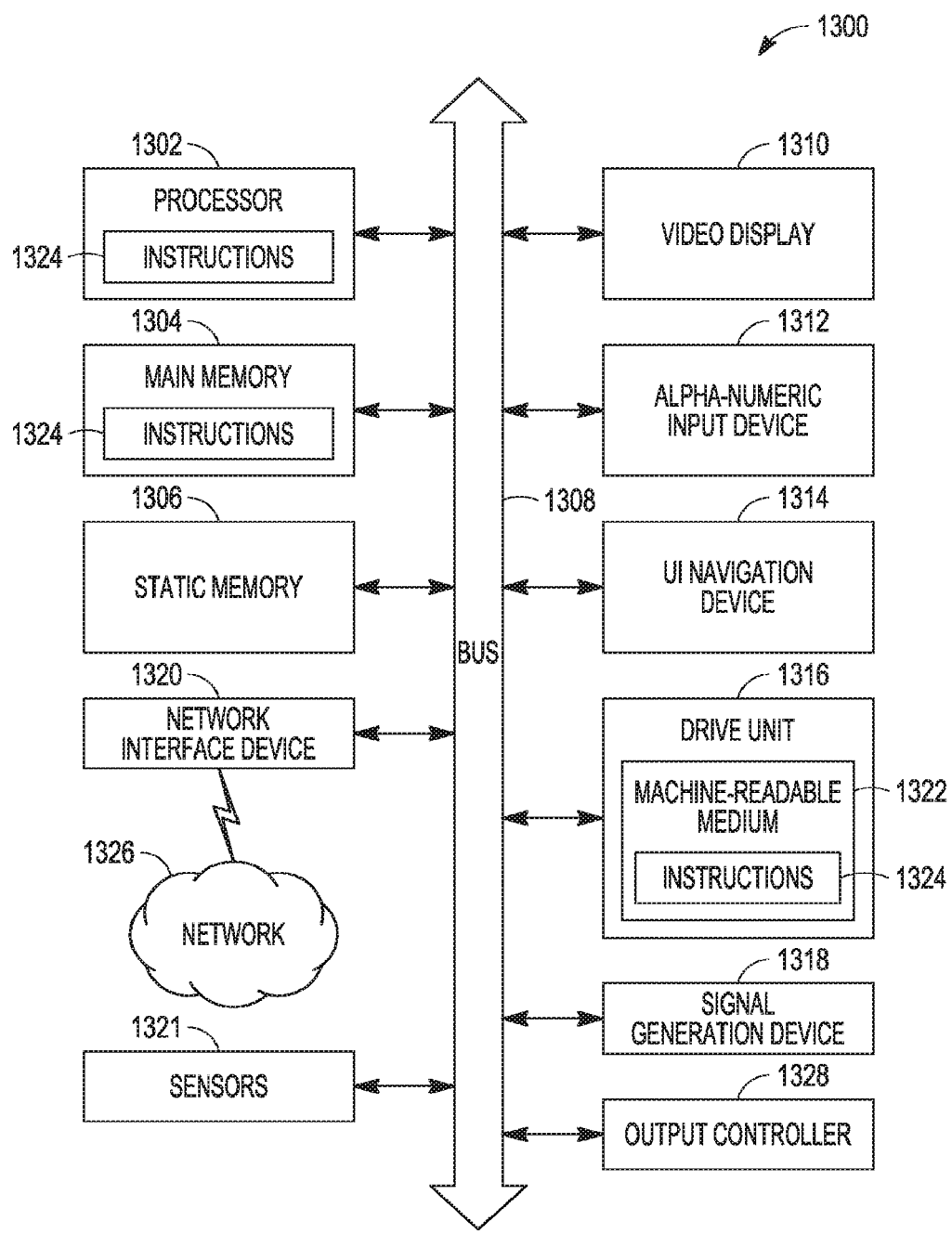
FIG. 13 is a block diagram illustrating components of a machine, according to some example embodiments, able to read instructions from a machine-readable medium and perform any one or more of the methodologies discussed herein.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a UE (e.g., UE 200, UE 501), the offset calculator 210, an eNB (e.g., eNB 300, MeNB 502), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine 1300. Further, while only a single machine 1300 is illustrated, the term "machine" shall also be taken to include any collection of machines 1300 that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a video display 1310, an alphanumeric input device 1312 (e.g., a keyboard), and a user interface (UI) navigation device 1314 (e.g., a mouse). In an example, the video display 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a Global Positioning System (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media 1322.

While the machine readable medium 1322 is illustrated as a single medium, the term "machine readable medium" may include a single medium or multiple media e.g., a centralized or distributed database, and/or associated caches and servers) configured to store the one or more instructions 1324.

The term "machine readable medium" may include any medium that is capable of storing, encoding, or carrying instructions 1324 for execution by the machine 1300 and that cause the machine 1300 to perform any one or more of the techniques of the present disclosure, or that is capable of storing, encoding or carrying data structures used by or associated with such instructions 1324. Non-limiting machine readable medium 1322 examples may include solid-state memories, and optical and magnetic media. Specific examples of machine readable media 1322 may include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; random access memory (RAM); and CD-ROM and DVD-ROM disks. In some examples, machine readable media 1322 may include non-transitory machine readable media. In some examples, machine readable media 1322 may include machine readable media 1322 that is not a transitory propagating signal.

The instructions 1324 may further be transmitted or received over a communications network 1326 using a transmission medium via the network interface device 1320 utilizing any one of a number of transfer protocols (e.g., frame relay, interact protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas 201, 301 to connect to the communications network 1326. In an example, the network interface device 1320 may include a plurality of antennas 201, 301 to wirelessly communicate using at least one of single-input multiple-output (SIMO), multiple-input multiple-output (MIMO), or multiple-input single-output (MISO) techniques. In some examples, the network interface device 1320 may wirelessly communicate using multiple user MIMO techniques. The term "transmission medium" shall be taken to include any intangible medium that is capable of storing, encoding or carrying instructions 1324 for execution by the machine 1300, and includes digital or analog communications signals or other intangible medium to facilitate communication of such software.

Example UE

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 14:
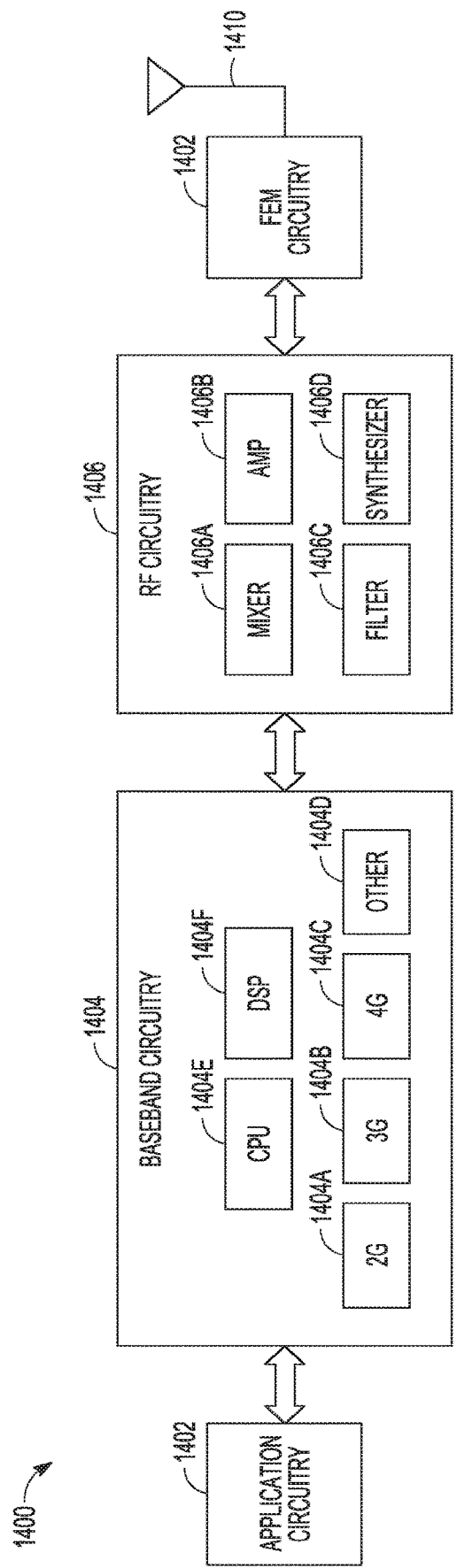
FIG. 14 illustrates example components of a UE, in accordance to some example embodiments.

Embodiments described herein may be implemented into a system using any suitably configured hardware and/or software. FIG. 14 illustrates, for one embodiment, example components of a User Equipment (UE) device 1400. In some instances, LIE device 1400 can be the UE 102 or UE 200. In some embodiments, the UE device 1400 may include application circuitry 1402, baseband circuitry 1404, Radio Frequency (RF) circuitry 1406, front-end module (FEM) circuitry 1408 and one or more antennas 1410, coupled together least as shown.

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1404 may include circuitry such as, but not limited to, one or more single-core or multi-core processors. The baseband circuitry 1404 may include one or more baseband processors and/or control logic to process baseband signals received from a receive signal path of the RF circuitry 1406 and to generate baseband signals for a transmit signal path of the RF circuitry 1406. Baseband processing circuitry 1404 may interface with the application circuitry 1402 for generation and processing of the baseband signals and for controlling operations of the RF circuitry 1406. For example, in some embodiments, the baseband circuitry 1404 may include a second generation (2G) baseband processor 1404a, third generation (3G) baseband processor 1404b, fourth generation (4G) baseband processor 1404c, and/or other baseband processor(s) 1404d for other existing generations, generations in development or to be developed in the future (e.g., fifth generation (5G), 6G, etc.). The baseband circuitry 1404 (e.g., one or more of baseband processors 1404a-d) may handle various radio control functions that enable communication with one or more radio networks via the RF circuitry 1406. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, and/or constellation mapping/demapping functionality. In some embodiments, encoding/decoding circuitry of the baseband circuitry 1404 may include convolution, tail-biting convolution, turbo, Viterbi, and/or Low Density Parity Check (LDDC) encoder/decoder functionality. Embodiments of modulation/demodulation and encoder/decoder functionality are not limited to these examples and may include other suitable functionality in other embodiments.

In some embodiments, the baseband circuitry 1404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1404e of the baseband circuitry 1404 may be configured to run elements of the protocol stack for signaling of the PHY, MAC, RLC, PDCP and/or RRC layers. In some embodiments, the baseband circuitry may include one or more audio digital signal processor(s) (DSP) 1404f. The audio DSP(s) 1404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC). In some embodiments, the baseband circuitry 1404 may provide for communication compatible with one or more radio technologies. For example, in some embodiments, the baseband circuitry 1404 may support communication with an evolved universal terrestrial radio access network (EUTRAN) and/or other wireless metropolitan area networks (NYMAN), a wireless local area network (MILAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RE signals received from the FEM circuitry 1408 and provide baseband signals to the baseband circuitry 1404. RE circuitry 1406 may also include a transmit signal path which may include circuitry to up-convert baseband signals provided by the baseband circuitry 1404 and provide RF output signals to the FEM circuitry 1408 for transmission.

In some embodiments, the RF circuitry 1406 may include a receive signal path and a transmit signal path. The receive signal path of the RF circuitry 1406 may include mixer circuitry 1406a, amplifier circuitry 1406b and filter circuitry 1406c. The transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RE signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may, be zero-frequency baseband signals, although this is not a requirement. In some embodiments, mixer circuitry 1406a of the receive signal path may comprise passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FE M circuitry 1408. The baseband signals may be provided by the baseband circuitry 1404 and may be filtered by filter circuitry 1406c. The filter circuitry 1406c may include a low-pass filter (LPF), although the scope of the embodiments is not limited in this respect.

In some embodiments, the mixer circuitry 1406a of the receive signal path and the mixer circuitry 1406a of the transmit signal path may include two or more mixers and may be arranged for quadrature downconversion and/or upconversion respectively. In some embodiments, the mixer circuitry 1406a of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a may be arranged for direct downconversion and/or direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a requirement. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a I-O frequency (ITO). In some embodiments, the RF circuitry 1406 may include an IQ/polar converter.

FEM circuitry 1408 may include a receive signal path which may include circuitry configured to operate on RF signals received from one or more antennas 1140, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410.

In some embodiments, the LIE device 1400 may include additional elements such as, for example, memory/storage, display, camera, sensor, and/or input/output (I/O) interface.

EXAMPLES

Example 1 is an apparatus of a user equipment 200 (UE), the apparatus comprising: transceiver circuitry and processing circuitry 306. The transceiver circuitry configured to: connect to a master cell group (MCG) via a master Evolved Node B 502 (eNB) and a secondary cell group (SCG) via a secondary eNB 503; receive a first reference signal from the master eNB 502; and receive a second reference signal from a secondary eNB 503. The processing circuitry 306 configured to: calculate a system frame number (SFN) and subframe timing difference 410 (SSTD) based on the first reference signal and the second reference signal; generate a measurement report 400 having a synchronization indicator 450 based on the calculated SSTD 410; and wherein the transceiver circuitry is further configured to send the generated measurement report 400 to the master eNB 502.

Example 2 includes the apparatus of Example 1, wherein the first reference signal includes a master information block (MIB) having SFN information for the MCG, and wherein the second reference signal includes a MIB having a SFN information for the SCG.

Example 3 includes the apparatus of the above examples, wherein the SSTD 410 includes a SFN timing difference between the MCG and the SCG that is calculated based on the SFN information for the MCG and the SFN information for the SCG.

Example 4 includes the apparatus of the above examples, wherein the first reference signal includes a frame boundary timing of the MCG and the second reference signal includes a frame boundary timing of the SCG, and wherein the SSTD 410 includes a frame boundary offset between the MCG and the SCG that is calculated based on the frame boundary timing of the MCG and the frame boundary timing of the SCG.

Example 5 includes the apparatus of Example 4, wherein the frame boundary offset between the MCG and the SCG is calculated by subtracting the frame boundary timing of the SCG from the frame boundary timing of the MCG.

Example 6 includes the apparatus of Example 4, wherein the SSTD 410 includes a subframe boundary offset measurement, the subframe boundary offset measurement being calculated from the frame boundary timing between the MCG and the SCG.

Example 7 includes the apparatus of Example 6, wherein the transceiver circuitry is further configured to: receive, from the MeNB 502, a margin value, the margin value being predetermined by a network operator associated with the MeNB 502; and wherein the synchronization indicator 450 is further based on the received margin value.

Example 8 includes the apparatus of Example 7, wherein the synchronization indicator 450 indicates that the MCG and the SCG are synchronous when the subframe boundary offset measurement in addition to the received margin value is less than 33 micro-seconds.

Example 9 includes the apparatus of Example 7, wherein the synchronization indicator 450 indicates that the MCG and the SCG are asynchronous when the subframe boundary offset measurement minus the received margin value is more than 33 micro-seconds.

Example 10 includes the apparatus of the above examples, wherein the processing circuitry includes a baseband processor to decode the first reference signal and the second reference signal.

Example 11 includes the apparatus of the above examples, further comprising a first antenna coupled to the transceiver to receive the first reference signal from the master eNB, and a second antenna coupled to the transceiver to receive a second reference signal from the secondary eNB.

Example 12 is a non-transitory computer-readable storage medium that stores instructions 1324 for execution by one or more processors 1302 to perform operations for any of the Examples 1-11

Example 13 is an apparatus of an evolved node B 300 (eNB) configured to operate as a master eNB 502 in a dual connectivity (DC) enhancement mode, the apparatus comprising: transceiver circuitry to: receive, from a user equipment 200 (UE), a measurement report 400, the measurement report 400 having a system frame number (SFN) and subframe timing difference 410 (SSTD); and a processing circuitry 206 to: determine a subframe boundary alignment of the master eNB 502 and a secondary eNB 503 based on the received measurement report 400; and wherein the transceiver circuitry is further configured to send the determined subframe boundary alignment.

Example 14 includes the apparatus of Example 13, wherein the determined subframe boundary alignment is sent using radio resource control (RRC) signaling.

Example 15 includes the apparatus of Examples 13-14, wherein the processing circuitry 206 is further configured to determine a quantized step based on the determined subframe boundary alignment, and the transceiver circuitry is further configured to send the determined quantized step.

Example 16 includes die apparatus of Example 13-15, wherein the processing circuitry 206 is further configured to determine a discontinuous reception (DRX) pattern based on the determined subframe boundary alignment, and the transceiver circuitry is further configured to send the determined DRX pattern.

Example 17 is the UE 200 of any of Examples 1-16.

Example 18 is the network entity of any of Examples 11-16.

Example 19 may include any of the methods of communicating in a wireless network as shown and described herein.

Example 20 may include any of the systems for providing wireless communication as shown and described herein.

Example 21 may include any of the devices for providing wireless communication as shown and described herein.

The foregoing description of one or more implementations provide illustration and description, but is not intended to be exhaustive or to limit the scope of the embodiments disclosed herein to the precise form disclosed. Modifications and variations are possible in light of the above teachings or may be acquired from practice of various implementations of the embodiments disclosed herein.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An apparatus comprising:
    at least one processor configured to cause a user equipment (UE) to:
        configure the UE for Dual Connectivity (DC) operation, wherein during the DC operation, in a radio resource control (RRC) connected mode the UE is configured to use radio resources from a master base station of a Master Cell Group (MCG) and a secondary base station of a Secondary Cell Group (SCG), and wherein as pan of the DC operation, the processor is configured to:
            decode first signaling received in a first subframe from the master base station, the first signaling including a first Master Information Block (MIB),
            decode second signaling received in a second subframe from the secondary base station, the second signaling including a second MIB, wherein the first MIB and the second MIB each include a system frame number;
            calculate, a subframe number (SFN) offset between the master base station and the secondary base station, a frame boundary offset between the master base station and the secondary base station, and a subframe boundary offset between the master base station and the secondary base station;
            generate an SFN and subframe timing difference (SSTD) measurement report including the SFN offset, the frame boundary offset, and the subframe boundary offset,
            wherein the SFN offset is reported as one of 1024 values, wherein the frame boundary offset is reported as one of 10 values, and wherein the subframe boundary offset is granulized to a step size of Q_step×Ts in the SSTD measurement report; and
            encode RRC signaling for transmission to the master base station.

2. The apparatus of claim 1, wherein the RRC signaling includes a MeasResults information element (IE) including the SFN offset, the frame boundary offset, and the subframe boundary offset.

3. The apparatus of claim 1, wherein the SSTD measurement report is to indicate:
    a synchronous DC operation when a difference in reception timing between the first subframe and the second subframe is 33 microseconds or less; or
    an asynchronous DC operation when a difference in reception timing between the first subframe and the second subframe is greater than 33 microseconds.

4. The apparatus of claim 1, wherein the at least one processor is configured to encode the RRC signaling to include the SSTD measurement report for one or both of alignment of a discontinuous reception (DRX) pattern or identification of a measurement gap.

5. The apparatus of claim 1, wherein Ts is equal to 1/(15000×2048) seconds and a value for Q_step is 10.

6. The apparatus of claim 1, wherein the apparatus further comprises two or more antennas and a transceiver, the two or more antennas and the transceiver configured to transmit the SSTD measurement report in RRC signaling to the master base station.

7. A user equipment (UE) comprising:
    wireless communication circuitry; and
    at least one processor coupled to the wireless communication circuitry configured to cause the UE to:
        configure the UE for Dual Connectivity (DC) operation, wherein during the DC operation, in a radio resource control (RRC) connected mode the UE is configured to use radio resources from a master base station of a Master Cell Group (MCG) and a secondary base station of a Secondary Cell Group (SCG), and wherein as part of the DC operation, the processor is configured to:
            decode first signaling received in a first subframe from the master base station, the first signaling including a first Master Information Block (MIB);

decode second signaling received in a second subframe from the secondary base station, the second signaling including a second MIB, wherein the first MIB and the second MIB each include a system frame number calculate, a subframe number (SFN) offset between the master base station and the secondary base station, a frame boundary offset between the master base station and the secondary base station, and a subframe boundary offset between the master base station and the secondary base station;

generate an SFN and subframe timing difference (SSTD) measurement report including the SFN offset, the frame boundary offset, and the subframe boundary offset;

wherein the SFN offset is reported as one of 1024 values, wherein the frame boundary offset is reported as one of 10 values, and wherein the subframe boundary offset is granulized to a step size of Q_step×Ts in the SSTD measurement report; and encode RRC signaling for transmission to the master base station.

8. The UE of claim 7, wherein the RRC signaling includes a MeasResults information element (IE) including the SFN offset, the frame boundary offset, and the subframe boundary offset.

9. The UE of claim 7,
wherein the SSTD measurement report is to indicate either:
a synchronous DC operation when a difference in reception timing between the first subframe and the second subframe is 33 microseconds or less; or
an asynchronous DC operation when a difference in reception timing between the first subframe and the second subframe is greater than 33 microseconds.

10. The UE of claim 7, wherein the at least one processor is configured to encode the RRC signaling to include the SSTD measurement report for one or both of alignment of a discontinuous reception (DRX) pattern or identification of a measurement gap.

11. The UE of claim 7, wherein Ts is equal to 1/(15000×248) seconds and a value for Q_step is 10.

12. An apparatus comprising:
at least one processor configured to cause a master base station of a Master Cell Group (MCG) to:
configure the master base station for Dual Connectivity (DC) operation, wherein during the DC operation, in a radio resource control (RRC) connected mode a user equipment (UE) is to use radio resources from the master base station and a secondary base station of a Secondary Cell Group (SCG), and wherein as part of the DC operation, the at least one processor is configured to:
encode first signaling for transmission to the UE in a first subframe, the first signaling including a first Master Information Block (MIB), wherein the first MIB includes a system frame number; and
decode, from RRC signaling received from the UE, a subframe number and subframe timing difference (SSTD) measurement report indicating a timing difference between the master base station and the secondary base station,
wherein the SSTD measurement report includes a subframe number (SFN) offset, a frame boundary offset, and a subframe boundary offset,
wherein the SFN offset is reported as one of 1024 values, wherein the frame boundary offset is reported as one of 10 values, and wherein the subframe boundary offset is granulized to a step size of Q_step×Ts in the SSTD measurement report.

13. The apparatus of claim 12, wherein the RRC signaling received from the UE includes a MeasResults information element (IE) including the SFN offset, the frame boundary offset, and the subframe boundary offset.

14. The apparatus of claim 12,
wherein the SSTD measurement report is to indicate either:
a synchronous DC operation when a difference in reception timing between the first subframe and the second subframe is 33 microseconds or less; or
an asynchronous DC operation when a difference in reception timing between the first subframe and the second subframe is greater than 33 microseconds.

15. The apparatus of claim 12, wherein the at least one processor is configured to decode the SSTD measurement report from the RRC signaling and determine an alignment of a discontinuous reception (DRX) based on the SSTD measurement report.

16. The apparatus of claim 12, wherein the at least one processor is configured to decode the SSTD measurement report from the RRC signaling and identify a measurement gap for the UE based on the SSTD measurement report.

17. The apparatus of claim 12, wherein Ts is equal to 1/(15000×2048) seconds and a value for Q_step is 10.

18. A non-transitory computer-readable storage medium storing program instructions executable by one or more processors of a master base station of a Master Cell Group (MCG) to cause the MCG to:
configure the master base station for Dual Connectivity (DC) operation, wherein during the DC operation, in a radio resource control (RRC) connected mode a user equipment (UE) is to use radio resources from the master base station and a secondary base station of a Secondary Cell Group (SCG), and wherein as part of the DC operation, the one or more processors are configured to:
encode first signaling for transmission to the UE in a first subframe, the first signaling including a first Master Information Block (MIB), wherein the first MIB includes a system frame number;
decode, from RRC signaling received from the UE, a subframe number and subframe timing difference (SSTD) measurement report indicating a timing difference between the master base station and the secondary base station,
wherein the SSTD measurement report includes a subframe number (SFN) offset, a frame boundary offset, and a subframe boundary offset,
wherein the SFN offset is reported as one of 1024 values, wherein the frame boundary offset is reported as one of 10 values, and wherein the subframe boundary offset is granulized to a step size of Q_step×Ts in the SSTD measurement report.

19. The non-transitory computer-readable storage medium of claim 18,
wherein the RRC signaling received from the UE includes a MeasResults information element (IE) including the SFN offset, the frame boundary offset, and the subframe boundary offset.

20. The non-transitory computer-readable storage medium of claim 18,
wherein the SSTD measurement report is to indicate either:

a synchronous DC operation when a difference in reception timing between the first subframe and the second subframe is 33 microseconds or less; or an asynchronous DC operation when a difference in reception timing between the first subframe and the second subframe is greater than 33 microseconds.

21. The non-transitory computer-readable storage medium of claim 18, wherein the one or more processors are further configured to decode the SSTD measurement report from the RRC signaling and determine one of an alignment of a discontinuous reception (DRX) and a measurement gap based on the SSTD measurement report.

22. The non-transitory computer-readable storage medium of claim 18, wherein Ts is equal to $1/(15000\times2048)$ seconds and a value for Q_step is 10.

* * * * *